United States Patent [19]

Brusaglino et al.

[11] 4,256,997
[45] Mar. 17, 1981

[54] APPARATUS FOR THE SUPPLY, REGULATION AND CONTROL OF DIRECT CURRENT ELECTRICAL MACHINES

[75] Inventors: Giampiero Brusaglino, Turin; Giorgio Peri, Gussola, both of Italy

[73] Assignee: Fiat Societa per Azioni, Turin, Italy

[21] Appl. No.: 918,202

[22] Filed: Jun. 22, 1978

[30] Foreign Application Priority Data

Jul. 28, 1977 [IT] Italy ............................... 68759 A/77

[51] Int. Cl.³ ............................................. H02P 1/23
[52] U.S. Cl. .................................. 318/254; 318/138; 318/439
[58] Field of Search ......................... 318/254, 138, 439

[56] References Cited

U.S. PATENT DOCUMENTS

| | | | |
|---|---|---|---|
| 3,569,806 | 3/1971 | Braicsford | 318/254 |
| 3,735,216 | 5/1973 | Oemura | 318/138 |
| 3,903,462 | 9/1975 | Kühnlein | 318/138 |
| 3,903,463 | 9/1975 | Kandmori | 318/138 |
| 4,047,084 | 9/1977 | Ban | 318/254 A |

*Primary Examiner*—J. V. Truhe
*Assistant Examiner*—John W. Redman
*Attorney, Agent, or Firm*—Sughrue, Rothwell, Mion, Zinn and Macpeak

[57] ABSTRACT

The supply, regulation and control of a direct current electrical machine such as a motor or generator having a number of winding sections is controlled by energization of the winding sections by staggered pulses which combine to produce a reasonably constant total winding current, the control being by means of first and second pairs of transistor switches controlled by respective control elements, such as magnetic pick-ups or photoelectric detectors, responsive to the rotation of the machine. Alternatively the machine can be operated with intermittent excitation for low speed traction or starting by supplying appropriately shaped control signals to the control elements connected to the transistor switches.

1 Claim, 12 Drawing Figures

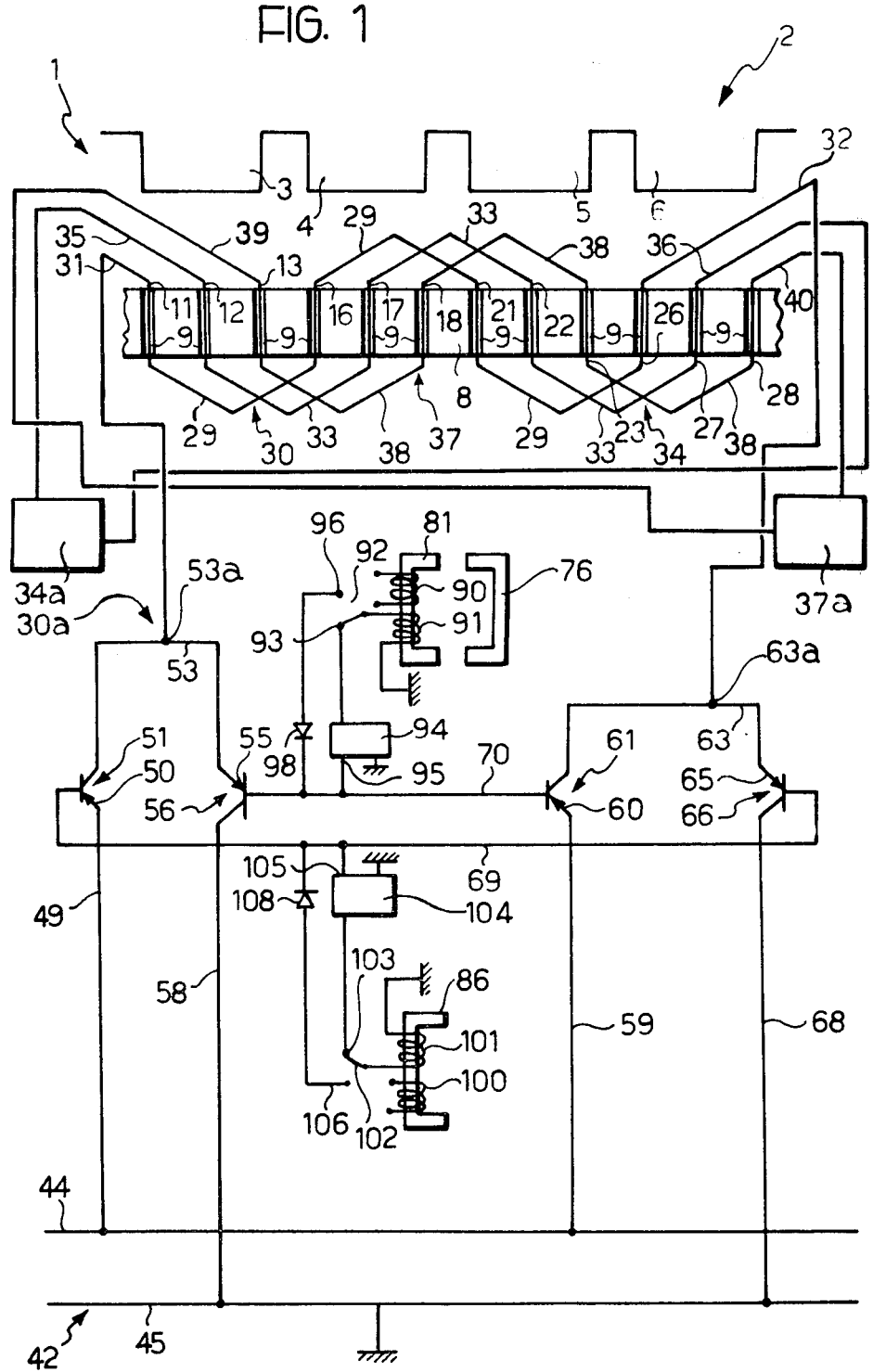

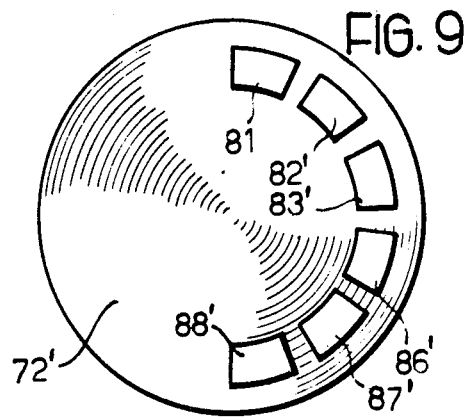
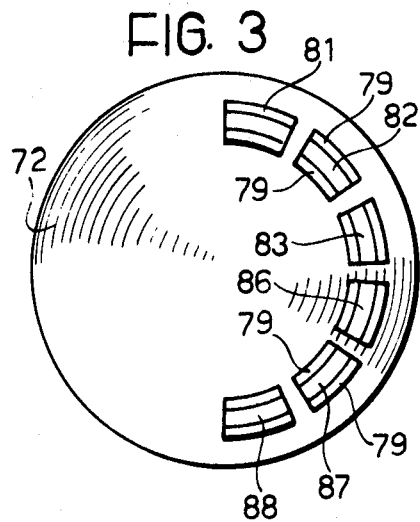
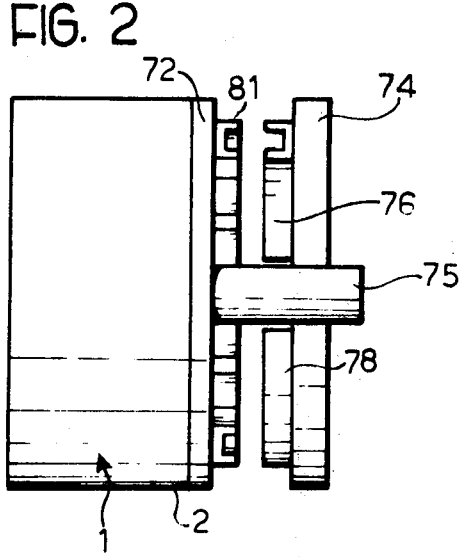
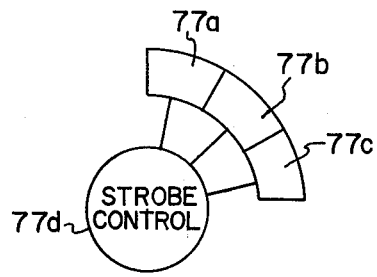
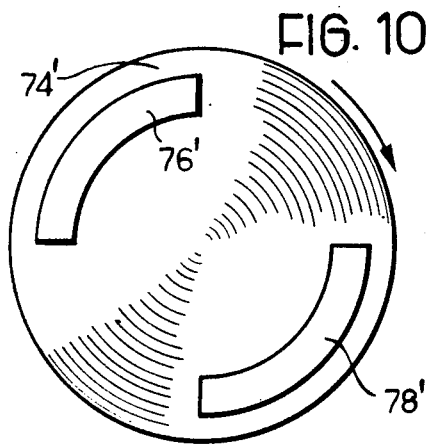
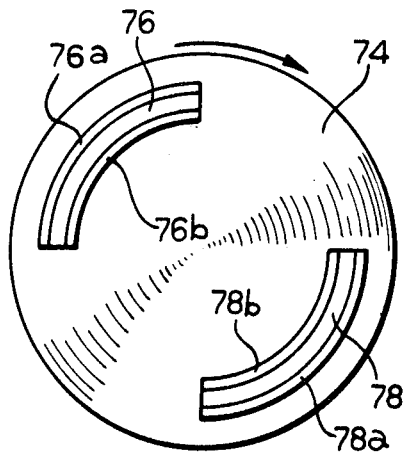

APPARATUS FOR THE SUPPLY, REGULATION AND CONTROL OF DIRECT CURRENT ELECTRICAL MACHINES

The present invention relates to a supply, regulation and control apparatus for direct current electric machines with electronic commutation.

It is known to provide electronic commutation for direct current electric machines, that is, brushless machines. The rotor winding of such machines is subdivided into independent sections, supplied by a common power supply and control unit interposed between the direct current supply and the said sections for the purpose of switching in the different sections successively while the machine is in operation.

Such supply and control units of known type have circuits including controlled rectifiers with associated triggering control elements, and extinguisher circuits necessary for direct current operation of the controlled rectifiers. The control elements generally comprise optical devices such as photoelectric cells which register the angular position of the rotor of the machine. Such optical devices have the disadvantage, however, of being somewhat fragile and not very reliable, added to which the use of controlled rectifiers is rather expensive because of the need for associated extinguisher circuits.

Moreover, with the aforesaid known type of electronic control apparatus using controlled rectifiers it is rather difficult to effect speed regulation of the machine by intermittent excitation of the armature circuit, which is generally regarded as the best method of regulation, especially in traction service at low rotational speeds, avoiding the need to connect armature resistances for power dissipation, because the use of controlled rectifiers as switching elements for the armature circuit would further complicate the control apparatus.

An object of the present invention is to provide supply and control apparatus for electronic commutation of direct current electric machines, which is particularly suitable for the control of direct current electric motors, especially electric traction motors, utilizing reliable control elements by means of which electronic commutation and speed control by intermittent excitation can easily be effected. A further object is to provide such supply and control apparatus in which the absorption of current from the power supply by the machine is as constant as possible.

SUMMARY OF THE INVENTION

According to the present invention there is provided an apparatus for the supply, regulation and control of direct current electrical machines with electronic commutation and with an armature winding divided into individual winding sections, in which the apparatus has a plurality of distinct sections each for the supply and control of an associated armature winding section, each apparatus section including first and second control elements and a first pair and a second pair of electronic switching means each comprising at least one transistor, the transistors of each pair of switching means being connected in parallel, and the switching control elements of the transistors of the first of the two pairs being connected to and controlled by the first control element, whilst the switching control elements of the transistors of the second of the two pairs are connected to and controlled by the second control element.

The apparatus of the invention, in controlling the supply of current to or from the rotor windings of the machine, avoids the use of direct switching of the current in the rotor windings.

BRIEF DESCRIPTION OF THE DRAWINGS

The invention will now be further described with reference to the accompanying drawings, by way of nonrestrictive example, which illustrate the application of the invention to the control of a motor, and in which:

FIG. 1 shows diagrammatically a direct current electric motor with electronic switching, equipped with a supply and control apparatus according to one embodiment of the invention;

FIG. 2 is a diagrammatic side elevation of discs forming part of the apparatus of FIG. 1, and including the controlled electric motor;

FIGS. 3 and 4 are plan views of the discs shown in FIG. 2;

FIGS. 9 and 10 are plan views of discs for use in a variant of the control apparatus of the invention.

FIG. 12 illustrates a plurality of strobe lamps provided to permit intermittant excitation of the motor.

DESCRIPTION OF THE PREFERRED EMBODIMENTS

Figure 5:
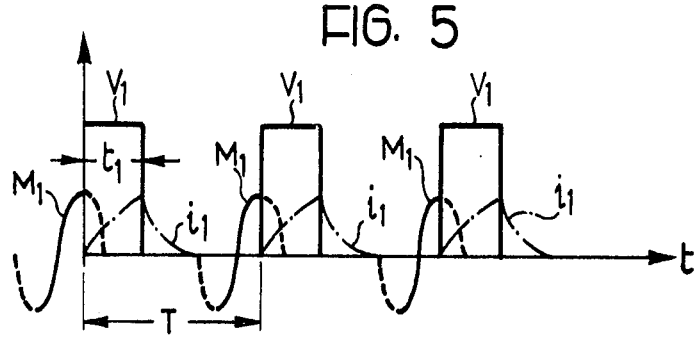
FIGS. 5, 6, 7, 8 illustrate the signals at certain points in the apparatus in its operation with controlled switching.

FIG. 1 shows diagrammatically a direct current electric motor 1 with its rotor and its stator 2 shown developed in one plane, the stator 2 having two pairs of magnetic poles of alternate North and South polarity, shown respectively as 3, 4, 5, 6. The rotor 8 of the motor is fitted with three pole cables, indicated as 9, and one conductor per pole. There is one conductor in each cable 9.

There are therefore four triads of cables 9 distributed around the periphery of the rotor at angular spacings equal to those between the stator magnetic poles. The conductors of the first triad of cables are indicated as 11, 12, 13, those of the second triad as 16, 17, 18, and those of the third triad as 21, 22, 23, whilst the conductors of the fourth triad are designated as 26, 27 and 28.

The conductors 11, 16, 21 and 26, of the first cable of each triad are interconnected in series by frontal conductors 29 so that the electromotive forces which are induced in them during operation of the motor will add up and constitute with the front conductors 29 a first section 30 of the rotor winding of the motor, this section 30 having terminal conductors 31 and 32.

The conductors 12, 17, 22, 27 of the second cables of each triad are similarly interconnected in series by frontal conductors 33 which together with said conductors constitute a second section 34 of the rotor winding of the motor, having terminal conductors 35 and 36. Finally, a third section 37 of the rotor winding, having terminal conductors 39 and 40 is formed by the third conductors 13, 18, 23, 28 of each triad of cables 9 and by frontal conductors 38 which connect these conductors in series.

To each of the rotor winding sections 30, 34, 37 there is connected a respective section of a supply and control apparatus according to the invention. In FIG. 1 there is shown, for the sake of brevity, only the section 30a of the apparatus associated with the first section 30 of the rotor winding.

A direct current power supply 42 is formed by two lines 44 and 45 of positive and negative polarity respectively. The positive supply line 44 is connected through a conductor 49 to the emitter 50 of a p-n-p transistor 51 the collector of which is connected via a conductor 53 to the emitter 55 of a second p-n-p transistor 56 having its collector connected via a conductor 58 to the negative line 45 of the supply 42.

The positive supply line 44 is also connected by a conductor 59 to the emitter 60 of a third p-n-p transistor 61, the collector of which is connected via a conductor 63 to the emitter 65 of a fourth p-n-p transistor 66, the collector of which is connected via a conductor 68 to the negative supply line 45.

The terminal conductor 31 of the rotor winding section 30 is connected to an intermediate joint 53a of the conductor 53 interconnecting the collector of the transistor 51 and the emitter of the transistor 56, whilst the other terminal conductor 32 of the section 30 is connected to an intermediate point 63a of the conductor 63 interconnecting the collector of the transistor 61 and the emitter of the transistor 66. The bases of the two transistors 51 and 66 are interconnected by a conductor 69, whilst the bases of the transistors 56 and 61 are interconnected by a conductor 70.

As shown in FIG. 2, a disc 72 is affixed to a front of the stator 2 of the motor 1, whilst another disc 74 parallel to the disc 72 is keyed to the motor shaft 75, which is fixed to the rotor of the motor 1.

FIGS. 3 and 4 show the discs 72 and 74 in plan view, showing their mutually facing surfaces. Upon the face of the rotary disc 74 which faces the stator disc 72 there are affixed two permanent magnets 76 and 78 of arcuate shape, arranged with their arcs concentric and in opposite quadrants. The two magnets 76 and 78 are of U-shaped cross section with arcuate North and South pole faces 76a, 76b and 78a, 78b respectively facing towards the stator disc 72, the arcuate North pole faces 76a and 78a being radially outermost.

Upon the face of the stator disc 72 which faces the rotary disc 74 there is affixed a series of first magnetic cores arranged in a first quadrant and a series of second magnetic cores arranged in a second quadrant adjacent the first quadrant. Each series is formed, in the illustrated embodiment, of three U-section arcuate cores of ferromagnetic material, for example ferrite, having upstanding arcuate faces 79 which face towards the pole faces of the magnets 76 and 78 and are aligned with respective said faces (FIG. 2). The cores are so dimensioned and positioned that upon rotation of the disc 74 the faces 79 come into exact register with the respective pole faces 76a, 78a and 76b, 78b of the magnets 76 and 78 on the stator disc 72. The cores of the first series are designated as 81, 82, 83 and those of the second series as 86, 87, 88.

In FIG. 1 the cores 81 and 86 are shown diagrammatically. The core 81 bears a magnetizing winding 90 supplied from a source of alternating or pulsed current, as will be made clear in the description of the operation of the apparatus, and a pick-up winding 91 one end of which is connected to earth and the other end of which is connected to a commutator switch 92.

The switch 92 is connected in a first position to a contact 93 connected to a rectifier bridge 94 including a smoothing capacitor, the output 95 of which is connected to the bases of the transistors 56 and 61 via the conductor 70. In its second position the commutator switch 92 is connected to a contact 96 connected via a diode 98 to the conductor 70 and thus to the bases of the transistors 56 and 61.

The magnetic core 86 has a magnetizing winding 100 supplied from a source of alternating or pulsed current as later described and a pick-up winding 101 one end of which is connected to earth and the other end of which is connected to a commutator switch 102.

The switch 102 is connected in a first position to a contact 103 connected to a rectifier bridge 104 including a smoothing capacitor, the output 105 of which is connected to the bases of the transistors 51 and 66 via the conductor 69. In its second position the switch 102 is connected to a contact 106 connected via a diode 108 to the conductor 69 and thus to the bases of the transistors 51 and 66.

The magnetizing windings 90 and 100 magnetize the cores 81 and 86 on which they are wound without bringing them to saturation.

FIG. 1 also shows the permanent magnet 76 with its pole faces facing the cooperating faces of the core 81 in an angular position of the rotary disc 74 in which the said magnet 76 and the said core 81 face each other.

To each rotor winding section 30, 34, 37 there is similarly connected a respective section 30a, 34a, 37a of the control apparatus, of which the section 30a has been described above, connected to the supply cable 42.

The sections 34a and 37a of the apparatus, shown schematically in FIG. 1, connected to the rotor winding sections 34 and 37, are also associated with respective pairs of the magnetic cores of the stator disc 72, the cores 82 and 87 being associated with the section 34a, and the cores 83 and 88 being associated with the section 37a. Each of these pairs of cores, analogously to the cores 81 and 86, is provided with a magnetizing winding connected to an alternating or pulsed current source, as will be described and a pick-up winding connected, via a two-position commutator switch, either to a rectifier bridge unit with a smoothing capacitor, or to a diode, the outputs of the said rectifier unit and of the said diode being connected to the transistors of the relative section of apparatus corresponding respectively to the transistors 56 and 61 or the transistors 51 and 66 of section 30a, in the manner previously described for the cores 81 and 86.

Thus each section 30a, 34a and 37a of the apparatus and hence each associated rotor winding section 30, 34 and 37, is connected to a respective pair of the magnetic cores affixed to the stator disc 72, these cores being successively in register with the magnets 76 and 78 of the rotary disc upon rotation of the disc 74, and the said magnets 76 and 78 being placed in such manner that when one of the said pair of cores is in register with one of said magnets, then the other core is out of register with the magnets.

OPERATION

The operation of the motor under control of the apparatus according to the invention will now be described, firstly in the condition in which interrupted excitation is not required. In this case the commutator switches 92 and 102 are brought into contact with the contacts 93 and 103 respectively, and the magnetizing windings 90 and 100 of the magnetic cores 81 and 86 associated with the section 30a, and the windings of the corresponding cores of the sections 34a and 37a, are connected to a source of alternating current.

It will be supposed that the rotor of the motor and the disc 74 start in an angular position such that the first three cores 81, 82, 83 are out of register with both of the magnets 76 and 78, whereas the second three cores 86, 87, 88 are in register with the magnet 78.

In this case the magnetizing winding 90 magnetizes the core 81 below saturation, inducing in the pick-up winding 91 an alternating electromotive force which, after rectification by the rectifier unit 94, causes a positive polarisation of switching control elements, that is, the bases, of the transistors 56 and 61, rendering the latter conductive and connecting the associated rotor winding section 30 across the positive and negative supply lines 44, 45 through the conductors 58 and 59, and causing current flow through the winding section 30 in a first direction, herein referred to as a "positive current".

Similarly the magnetizing windings of the cores 82 and 83, not saturated, connected to the rotor winding sections 34 and 37, induce electromotive forces in the respective pick-up windings which switch on the transistors of the respective sections 34a and 37a, corresponding to the transistors 56 and 61 of the section 30a. The rotor winding sections 34 and 37 are thus also traversed by positive current.

The cores 86, 87 and 88, being in register with the magnet 78, will be saturated, and consequently their pick-up windings will not provide any e.m.f., so that the transistors 51 and 66 will remain switched off.

Upon rotation of the disc 74 through one inter-core angular pitch in the direction indicated by the arrow in FIG. 4, the core 81 comes into register with the magnet 76, causing saturation of the core 81 so that the pick-up winding 91 ceases to detect an e.m.f. even though the associated magnetizing winding 90 continues to be energised. The transistors 56 and 61 are therefore cut off. As a result of the rotation of the disc 74, however, the core 86 is no longer in register with the magnet 78, so that the core 86 ceases to be saturated. The associated pick-up winding 101 therefore picks up from the associated magnetizing winding 100 an e.m.f. which, after rectification by the rectifier unit 104, causes conduction of the transistors 51 and 66, connecting the rotor winding section 30, via the conductors 49 and 68, to the positive and negative supply lines 44, 45 respectively, but with reversed polarity, so that the current flow in the section 30 is in the opposite direction to the first direction, such current flow being referred to herein as a "negative current".

The rotor winding sections 34 and 37, on the other hand, are still traversed by positive current since their associated cores 82 and 83 remain out of register with the magnets 76 and 78, whilst the cores 87 and 88, being in register with the magnet 78 are saturated.

Upon further rotation of the disc 74 through another inter-core pitch the core 87 emerges from registration with the magnet 78 whilst the core 82 enters registration with the magnet 76, so that the winding section 34 associated with this pair of cores 82, 87 will then be traversed by negative current, like the section 30. The first core 81 of the section 30, after such a further pitch rotation of the disc 74, remains saturated under the action of the permanent magnet 76, whilst the second core 86 of the section 30 remains outside the action of the magnets 76 and 78, so that its pick-up winding provides an e.m.f. which causes completion of the circuit connecting the winding section 34 to the line 42, so that the said winding section 34 passes a negative current.

The section 37 will also be traversed by a positive current because the first core 83 will not be under the influence of either of the permanent magnets 76 and 78, whilst the second core 88 is in register with one of the said magnets, and hence is saturated.

It follows that upon a further pitch rotation of the disc 74, all three winding sections 30, 34 and 37 will be traversed by negative current, after which, following another pitch rotation, the cycle previously described begins again. In short, the three winding sections are always traversed contemporaneously by a current, which is either positive or negative according to whether the second or third of the magnetic cores associated with the respective windings is under the influence of either of the permanent magnets 76 or 78 on the rotary disc 74.

The magnetic windings of the various magnetic cores 81–88 could alternatively be supplied with energising current having a waveform other than sinusoidal, provided the current varies with time so as to induce an electromotive force in the associated pick-up windings, the waveform of the induced e.m.f. not being of great importance since the outputs of the pick-up windings are rectified by the respective rectifier units.

The operation of the apparatus according to the invention will now be described in the mode of operation in which it is wished to power the motor with intermittent excitation which, as is known in the field of electrical machinery, means supplying the motor excitation current and the supply voltage in periodic pulses with a predetermined pulse repetition frequency, rather than continuously, so as to apply to the motor a voltage with a mean value less than that of the nominal supply voltage, the said mean voltage decreasing as the pulse repetition frequency increases.

Intermittent excitation of an electric motor may be necessary when the motor has to operate in traction service, upon starting, or at a very low rate of rotation, which cannot be achieved solely by continuous excitation of the motor.

In order to effect operation of the motor with intermittent excitation the switches 92 and 102 of the section 30a of the apparatus are made with the contacts 96 and 106 respectively, so that the pick-up windings 91 and 101 of the cores 81 and 86 are connected to the respective conductors 70 and 69 through the diodes 98 and 108 respectively.

In this mode of operation it is desirable that the total current drawn from the power supply by the motor should be as near as possible constant. In order to achieve this, intermittent excitation current is supplied to the three winding sections 30, 34, 37 with voltage pulses staggered relative to each other by one third of the periodic time T of the pulses.

Figure 6:
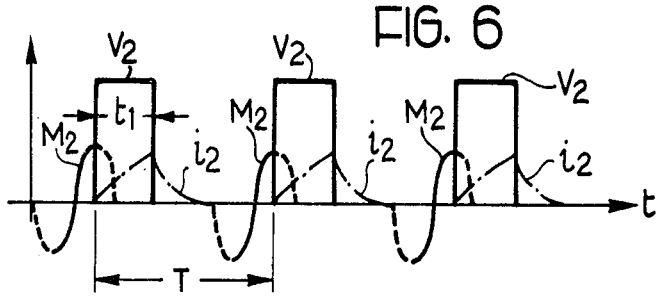
Figure 7:
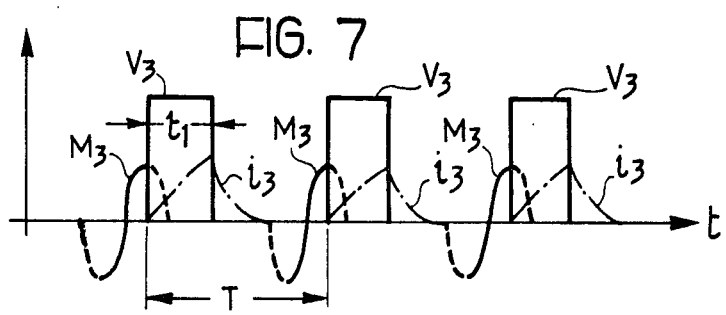

In the diagrams of FIGS. 5, 6 and 7 the dotted lines depict voltage waveforms, plotted against time t, of the voltages $V_1$, $V_2$ and $V_3$ respectively applied to the rotor winding sections 30, 34 and 37, and the chain-dotted lines the currents $i_1$, $i_2$ and $i_3$ passing through the winding sections 30, 34 and 37 during intermittent excitation. The period of the excitation pulses is indicated by T and the duration of each pulse by $t_1$. It will be seen that the currents $i_1$, $i_2$ and $i_3$ in the three sections are in the form of exponential pulses, staggered relatively to each other in time.

Figure 8:
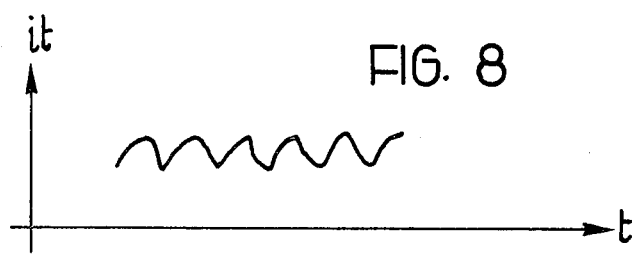

FIG. 8 shows, plotted against time t, the total current $i_t$ which the motor draws from the power supply, which at any given time is the sum of the instantaneous values of the currents $i_1$, $i_2$ and $i_3$. The resultant current $i_r$ varies little with time and can be smoothed by an inductance.

The intermittent excitation of the motor results from the energisation of the pairs of magnetizing windings of the three pairs of cores 81, 86; 82, 87 and 83, 88 each with respective periodic voltage signals shown as $M_1$, $M_2$ and $M_3$ in FIGS. 5, 6 and 7, staggered relatively to each other and relative to the voltages $V_1$, $V_2$, $V_3$. The voltage signals $M_1$, $M_2$ and $M_3$ are such that the voltages induced in the pick-up windings of the three pairs of cores are substantially in phase with the voltages $V_1$, $V_2$ and $V_3$ so that the transistors 51, 56, 61, 66 of the section 30a, and the corresponding transistors of the other sections 34a and 37a, conduct precisely for the duration $t_1$ of the voltage pulses $V_1$, $V_2$ and $V_3$ to be applied to the motor windings 30, 34 and 37.

It will be understood that the apparatus according to the invention can be embodied with variants of what has been described, without departing from the scope of the invention. For example, the apparatus can be used to control an electrical machine operating as a generator, rather than a motor as described, except for the difference in the direction of rotation which this would entail.

In a further variant the positions of the discs 72 and 74 could be reversed, by mounting the disc 72 upon the rotor and the disc 74 upon the stator of the machine, with the disadvantage, however, that sliding contacts or brushes would then have to be employed for making electrical connections to the windings of the magnetic cores on the disc 72.

The function performed by the transistors 51, 56, 61, 66 can also be carried out by each of a plurality of transistors in parallel having their bases controlled together when the current to be transmitted is high.

Figure 11:
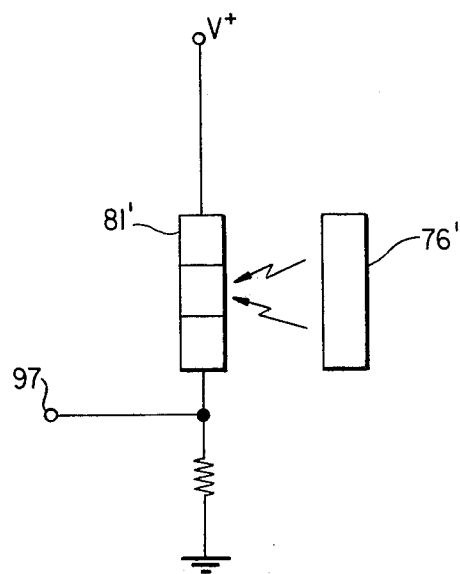
FIG. 11 illustrates control elements comprising a photo-transistor and a lamp.

Finally as shown in FIGS. 9, 10 and 11, the magnetic cores 81–88, acting as control elements, can be replaced by respective phototransistors 81′–88′ carried by a stator disc 72′ (FIG. 9) and the two permanent magnets 76 and 78 can be replaced by respective elongate lamps 76′, 78′, each extending along a quadrant of a rotary disc 74′(FIG. 10) arranged in opposite quadrants on said disc, so that when either lamp is in register with a given phototransistor, the latter conducts, or not, according to the type of phototransistor used to provide pick-up signals. In the embodiment shown in FIG. 11, the output 97 of phototransistor 81′ is applied to conductor 70.

When it is desired to produce, by means of optical elements, intermittent excitation, it will be necessary to replace the magnetic cores 81–88 by phototransistors and to replace each lamp 76′, 78′ as referred to above by a group of three stroboscopic lamps, 77a, 77b, 77c, FIG. 12, supplied with electrical pulses from strobe control 77d which are staggered relative to each other by one third of the excitation pulse period, analogously to pulses $V_1$, $V_2$, $V_3$ referred to above.

What is claimed is:

1. Apparatus for the supply, regulation and control of a direct current electrical machine with electronic commutation and with an armature winding divided into individual winding sections, said apparatus comprising a plurality of distinct sections each for the supply and control of an associated said armature winding section, each said apparatus section including first and second control elements and first and second pairs of electronic switching means each comprising at least one transistor having a switching control element, means connecting said at least one transistor of said first pair of switching means and said at least one transistor of said second pair of switching means in parallel, and means connecting said switching control element of said at least one transistor of said first pair of switching means to said first control element to be controlled thereby, means connecting said switching control element of said at least one transistor of said second of switching means to said second control element to be controlled thereby, a first disc fixed to a stator of said machine and a second disc fixed to a rotor of said machine and rotatable relative to said first disc, wherein said first and second control elements of each section of said apparatus comprise a plurality of photo-transistors arranged on said first disc and associated lamps cooperating with said plurality of phototransistors and disposed on said second disc, wherein said phototransistors are arranged on two successive quadrants of the first disc, and said associated lamps comprise (i) two sets of stroboscopic lamps arranged in arcs and extending over two opposite quadrants of said second disc, and (ii) means for energizing said stroboscopic lamps with pulses staggered by T/n, where T is the period of said pulses and n is the number of sections of said winding.

* * * * *